Aug. 11, 1970     C. ASMANSE     3,524,130

NON-CONTACT SPARK-GAP CURRENT TOOL-SETTING DEVICE

Filed Sept. 10, 1968     2 Sheets-Sheet 1

INVENTOR.
Charles Asmanes
BY

ATTORNEY.

United States Patent Office 3,524,130
Patented Aug. 11, 1970

3,524,130
NON-CONTACT SPARK-GAP CURRENT TOOL-SETTING DEVICE
Charles Asmanes, Oak Ridge, Tenn., assignor to the United States of America as represented by the United States Atomic Energy Commission
Filed Sept. 10, 1968, Ser. No. 758,879
Int. Cl. G01n 27/00; G08b 21/00; G01b 7/00
U.S. Cl. 324—71                          3 Claims

ABSTRACT OF THE DISCLOSURE

A non-contact tool-setting device has been provided for use on lathes or the like. The position of the tool relative to the workpiece is determined by measuring the current through an arc established between the tool and a reference electrode. The reference electrode is in the form of a precisely formed spherical ball seated on a special mount thereby providing certain advantages which facilitate highly accurate positioning of the tool relative to the workpiece.

BACKGROUND OF THE INVENTION

This invention was made in the course of, or under, a contract with the U.S. Atomic Energy Commission.

This invention relates generally to non-contact devices for accurately sensing the position of the tip of a cutting tool or the like and more specifically relates to a device wherein the position of the tool tip relative to a reference position is determined by measurement of the current flowing through an arc established between the tool tip and a reference electrode.

When setting up a digital computer controlled lathe or the like, a program tape is used to move the edge of the cutting tool through a predetermined path. The taped commands are precalculated in terms of the tool being in an initial known position or "reference" position. Thus, before machining can begin, it must be established that the tool edge is in the "reference" position. Also, during machining, the cutting tool is returned periodically to the reference position to determine if the tool must be realigned or replaced because of wear. The quality of the entire machining operation in highly dependent on the accuracy and the position of the tool referencing operation. It is common practice to establish these tool positions by means of feeler gauges, capacitance gauges, or the like, but each of these methods has disadvantages. In the case of the feeler gauge, for example, uncertainties are introduced because it is not known to what extent the feeler has been "pinched" during the measurement. One disadvantage of the capacitance gauge is that it is dependent upon tool geometry, and thus must be recalibrated when a tool is replaced. Some lathes are provided with a "tool position" for establishing the location of the tool before it is moved to a work position, but some error may be introduced merely in moving the tool from one of the positions to the other. All of these arrangements are limited in accuracy and position reproducibility that is required in very precise tape-controlled machining operations. From technological advances in metal fabrication and improvements in automating the machining of precision components, the need continually arises for more precise instruments and methods of establishing the position of the cutting tool of tape-controlled machines. The advances in precision machine tool design have exceeded the capability of the operator to measure the part and offset the tool each time a part is machined. Therefore, it is evident that there is a need for an accurate tool-setting device and especially one of the non-contact type since contact is undesirable because of the possibility of damaging a fragile and precisely contoured tip tool.

SUMMARY OF THE INVENTION

The non-contact tool-setting device of this invention overcomes the shortcomings of the prior art devices and has as its primary object the provision of a versatile non-contact measuring device useful for accurately indicating the position of a point such as a tool tip or the like relative to a reference point.

It is another object of this invention to provide a non-contact tool-setting device which affords a very high degree of accuracy.

Further, it is an object of the present invention to provide a tool-setting device which utilizes an arc discharge current between a reference electrode and the tool-cutting tip to indicate the position of the tool tip relative to the reference electrode.

Still another object of the present invention is to provide a non-contact tool-setting device which can be easily adapted to various machining tools.

Yet another object of the present invention is to provide a non-contact indicating device for setting a cutting tool of a tape-controlled mill work machine in a start or reference position for precision production milling of workpieces.

Further, another object of the present invention is to provide a non-contact tool-setting device for accurate reproduction in tape-controlled metal cutting and milling machines or the like.

Accordingly, the present invention calls for a non-contact tool-setting system for positioning a machine tool in a reference position for facilitating subsequent machining operations, comprising a reference electrode mounted on a fixed support in a reference position and a fixture for carrying the tool and movable with respect to the support. A voltage supply means is connected between the tool and the reference support for establishing a current-producing arc discharge between the reference electrode and the tool when the latter is moved to within a predetermined distance from the electrode with the current flowing in the arc increasing as the spacing between the probe and the tool decreases. A means is provided for continuously measuring the current flow through the arc discharge to determine the spacing between the reference electrode and the tool. The movement of the tool fixture is terminated at a predetermined displacement of the tool from the reference electrode thereby being positioned in the reference position.

Other objects and many of the attendant advantages of the present invention will become evident from the following description when taken in conjunction with the accompanying drawings, wherein like reference numerals indicate similar items throughout the figures.

DESCRIPTION OF THE PREFERRED EMBODIMENT

Figure 1:
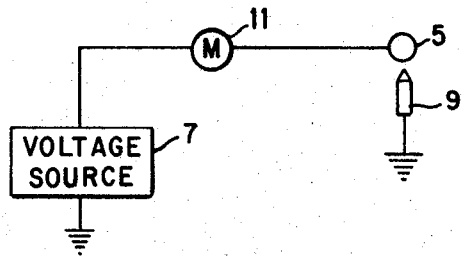
FIG. 1 is a block diagram illustrating circuitry of the subject device in elementary form.

Referring now to FIG. 1 the spark-gap system is shown in a basic schematic form and consists essentially of a precisely formed ball 5 of known radius, a voltage source 7 and a tool tip 9. An ammeter 11 is connected between the voltage source 11 and the ball 5 to measure the arc current once it is established between ball 5 and the tool tip 9. The ball 5 is mounted with its center coincident with a "reference" point whose position relative to the surface to be machined has been carefully predetermined. The surface of the ball, being a known distance from the predetermined point just referred to, serves as the reference electrode. As will be described, the reference electrode is used to position the tool tip 9 a known distance from the reference position. In a tape-controlled machine, for example, once the tool tip has been so positioned along the machine axis of interest, programmed cutting operations can begin.

Figure 2:
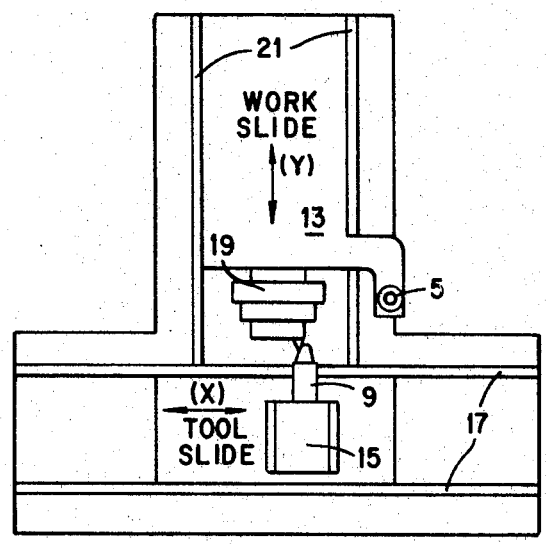
FIG. 2 is a schematic view of a machine slide of a conventional lathe, illustrating one way in which the present device may be mounted.

The ball 5, which is composed of current-conducting material, is mounted on a workpiece holding fixture 13 (FIG. 2), but is electrically insulated therefrom. There may be some machines where it would be more convenient to insulate the cutting tool. In this case, the ball is grounded by connecting it electrically to the workpiece-holding fixture and connecting the tool to the ungrounded terminal of the voltage supply. In either case, the voltage source 7 is connected between cutting tool 9 and the ball 5. The voltage supply is a conventional but highly stable variable-voltage D.C. supply. As shown in FIG. 2, the cutting tool is normally held in place by a tool holder 15 mounted on a slide way 17 movable in the X direction as indicated while the workpiece 19 held by fixture 13 is movable in the Y direction on slide way 21.

Figure 3:
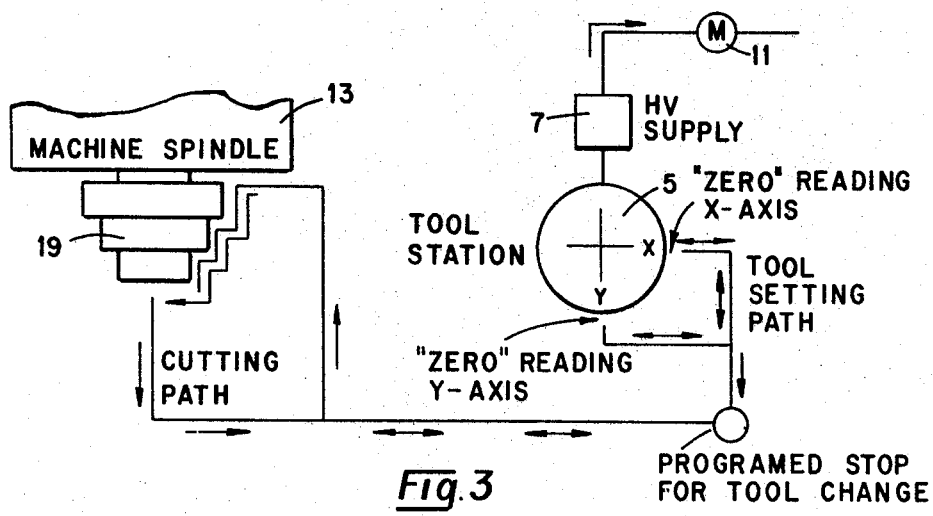
FIG. 3 is a schematic diagram showing a typical path followed by a cutting tool which is positioned initially by means of the subject device.

Shown for purposes of illustration in FIG. 3 is a typical programmed cutting path. This figure illustrates the accuracy which can be obtained with the present device for a X and Y axis path. The X axis machine slide is employed to pre-position the cutting tool close to the surface of the ball. The tool then is advanced slowly along the X axis until a reading of zero is obtained on the ammeter 11. This meter preferably is a zero-centered microammeter which measures the difference between the arc current and a pre-selected reference current. The arrangement is calibrated so that zero on the meter is obtained when the edge of the cutting tool is a selected distance from the surface of ball 5, indicating the tool reference position. The above-described procedure is repeated for the Y axis. These tool-setting operations may be accomplished manually or they can be accomplished automatically by conventional circuitry (not shown) which operates responsive to the arc current to deenergize the machine slides when the tool reaches the "zero-reading" position.

As pointed out above, it is essential to accurate machining that the initial position of the cutting tool be established accurately along the axis of interest. Establishing the tool position also is essential in the course of machining operations whenever it is necessary to replace the cutting tool. Still another benefit derived from the use of this arrangement is that the tool-setting operation can be used to compensate for normal wear of the cutting tool since it is the present edge of the cutting tool which is positioned relative to the ball.

Figure 4:
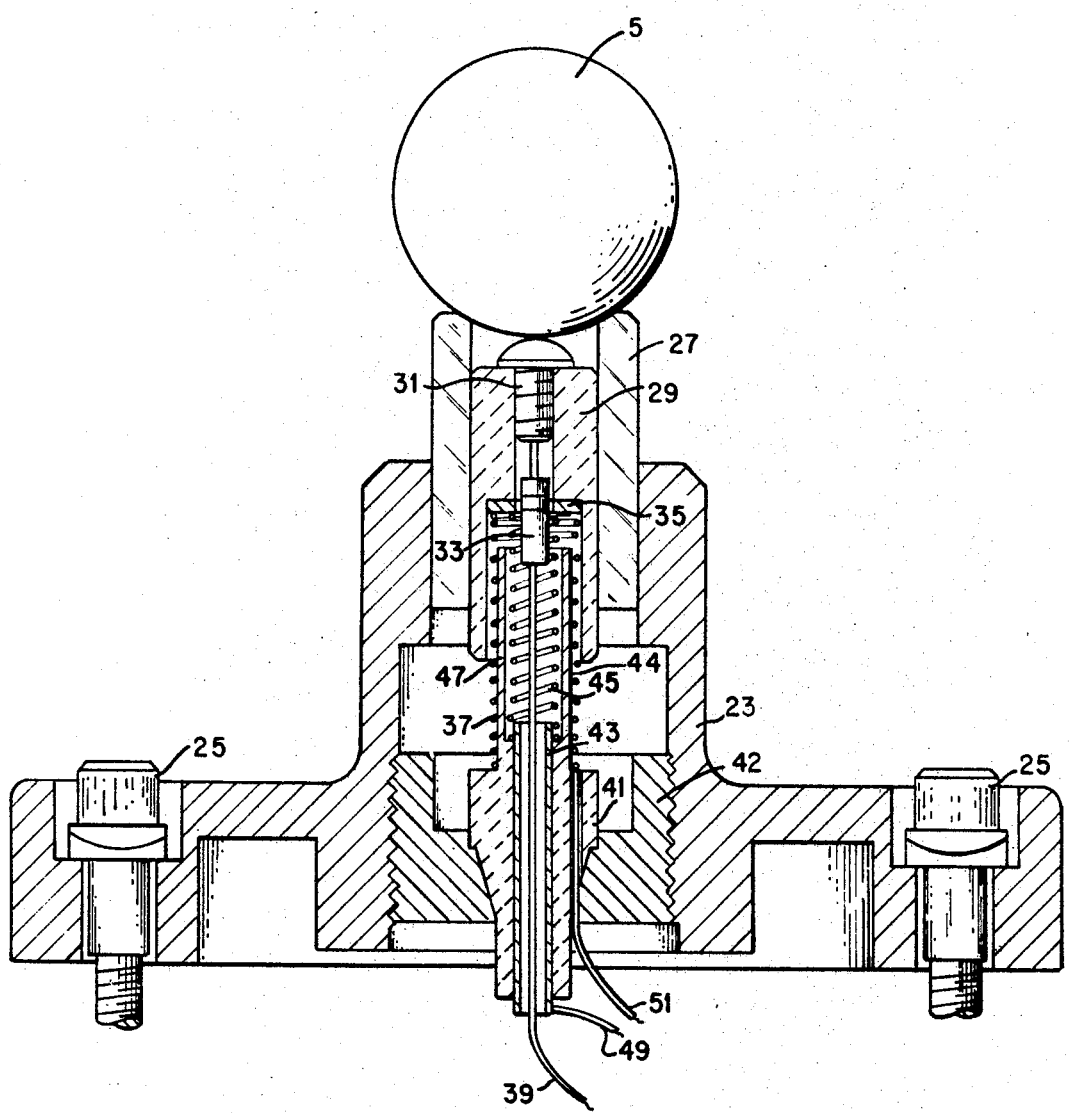
FIG. 4 is a longitudinal sectional view of a spherical reference electrode and mount therefor.

Referring now to FIG. 4, there is shown a preferred mounting pedestal in which ball 5 is held in the reference position. As shown, the mount includes an annular tubular base member 23 for rigid attachment to a lathe or to any other suitable support by means of screws 25. Extending upward from the base is a glass tube 27 whose upper end is precisely formed and polished to serve as a seat for ball 5. The diameter of tube 27 is appreciably smaller than that of the ball, so that all but a small part of the surface of the ball is accessible from outside the mount. A tubular non-conductive plunger 29 is slidably disposed in glass tube 27 and is provided with an axial opening adapted to receive a metal pin 31, the head of which extends upward to contact ball 5. The lower end of the pin is connected to a resistor 33 which extends through a central aperture in a conductive washer 35. The lower end of resistor 33 is connected by means of lead 39 to a terminal of the voltage supply 7. As shown, a coil spring 37 bears on the washer 35 to urge the pin and plunger assembly upward from a tubular support member 41 which is held in place by a threaded sleeve 42. Support member 41 is made of an electrical insulating material and has an upwardly extending hollow cylindrical spacer 44. An electrically conductive metal tube 43 is axially disposed in a lower central opening of support member 41 through which lead 39 extends. A second spring 45 is disposed coaxially with spring 37 and spaced therefrom by means of spacer 44. Spring 45 has its lower end connected electrically to tube 43 and its upper end extended to a length sufficient to establish contact with the electrically conductive washer 35 when the ball 5 is seated, thereby forming an electrical switch which is closed when ball 5 is properly seated and open when the ball is removed. The switch leads 49 and 51 are taken from the support member 41 at the lower end of tube 43 and the lower end of spring 37, respectively. Thus, the closed circuit path starting with lead 49 is through tube 43, spring 45, washer 33, spring 37, and out at lead 51. The switch is incorporated in a suitable circuit (not shown) to deenergize the machine slide if the cutting tool for some reason is driven inward past the tool reference position so that it dislodges the ball. In this arrangement, the normally closed switch opens if the ball moves .01 inch from its seated position. When the ball is dislodged from its seated position, the spring 37 moves the slidable plunger assembly upward, and away from spring 45, thereby opening the switch and deenergizing the machine slide drive. With this switch arrangement, a fragile tool would not be damaged if accidentally driven into the reference point or ball 5.

The use of a ball for the reference electrode has several other relatively unobvious advantages in that the cutting tool can approach the ball from virtually any angle with equivalent results. Another advantage is that the ball can be moved and then reseated without changing the position of the surface of the ball relative to the reference position. In fact, once the mount has been set up, the ball can be replaced with an equivalent ball without any need for further alignment.

Some cutting tools have various coatings or contaminants on the tip and are difficult to establish an arc from and when the arc is established it sometimes becomes too unstable for satisfactory measurement of the arc current. Considerable experimentation has established that a constant and reproducible arc can be obtained, even in non-conductive tools, if the tool tip is pre-conditioned by degreasing with a suitable solvent, such as perchloroethylene, then dried, and finally coated with a thin film of colloidal graphite. The graphite coating can be applied by brushing or dipping.

Thus, it can be seen that a non-contact spark-gap toolsetting device has been provided which is comparatively inexpensive, rugged, and permits the positioning of the cutting edge of a tool to be established accurately on a reproducible basis. The performance of the device is not dependent on the skill of an operator. The tool setter is small and, when provided with a magnetic base or other suitable support, can be mounted directly to the work-holding fixture of the lathe so as to automatically compensate for spindle growth.

Although this device has been described in terms of establishing the position of a cutting tool, it will be understood to have other useful applications. For example, the device can be used as an inspection device. Measurement can be made in the X, Y, and Z directions without the need of a precision spindle to move the spherical reference electrode as in most inspection devices.

What is claimed is:
1. In a tape controlled machining apparatus having a workpiece holder adjustable along the Y axis an X–Y coordinate system of said apparatus and a tool holder adjustable along the X-axis of said system, a non-contact tool setting device for positioning a machine tool to a predetermined reference position relative to said workpiece for facilitating subsequent machining operations, comprising:

a reference electrode carried by said workpiece holder in said reference position including a cylindrical pedestal mounting base having a central axially aligned opening therethrough, a precisely formed ball composed of an electrically conductive material, a tubular insulating member substantially smaller in diameter than said ball rigidly mounted in said central opening of said pedestal and having an upwardly extending portion from said pedestal, said tubular member forming at its upper extremity a seat for removably seating said ball, a plunger assembly co-axially disposed within said tubular seat in movable relationship therewith, an electrical contact pin carried by said plunger and extending past the upper surface of said plunger, a base member of electrically insulating material disposed within at the lower end of said pedestal mount, a first spring having one end disposed against said base member and the other end against said plunger for urging said plunger upward so that the head of said pin touches said ball when said ball is seated, said base member having an upwardly extending tubular insulating spacer member co-axially disposed within said first spring, a second spring co-axially disposed within said spacer member, said second spring being shorter in extensible length than said first spring, said plunger member having an electrically conductive surface against which said springs bear when said ball is seated so as to provide a switch which is disconnected when said ball is unseated, a first external electrical lead connected to said first spring, a second external electrical lead connected to said second spring, and means including a resistor connected in series with said pin in close proximity of said pin for providing an external electrical connection terminal to said reference electrode;

a source of high voltage connected between said tool and said external reference electrode terminal so as to establish a current producing arc discharge between the reference electrode ball and said tool when the latter is positioned within a predetermined distance from said electrode with the current flow produced by said arc increasing as the spacing between the electrode and the tool decreases; and an ammeter calibrated to read in units of displacement connected in series with said reference electrode for measuring the current flow through said arc so as to provide an indication of the displacement of said tool from said ball in accordance with the current flowing through said arc thereby referencing said tool in a known position relative to said workpiece.

2. A non-contact tool-setting device as set forth in claim 1 wherein said tool is coated with an electrically conductive coating, thereby increasing the electrical conductivity of said tool.

3. A non-contact tool setting device as set forth in claim 2 wherein said tool is coated with colloidal graphite.

References Cited

UNITED STATES PATENTS

| 2,364,237 | 12/1944 | Neff | |
| 2,752,690 | 7/1956 | Heath et al. | 33—174 |
| 3,315,156 | 4/1967 | Keller | 324—62 X |
| 3,319,163 | 5/1967 | Thompson | 324—61 |
| 3,439,263 | 4/1969 | Broyles | 324—33 |

EDWARD E. KUBASIEWICZ, Primary Examiner

U.S. Cl. X.R.

33—174; 340—282